United States Patent [19]

Schröder et al.

[11] Patent Number: 4,762,266
[45] Date of Patent: Aug. 9, 1988

[54] METHOD FOR PERFORMING REMOTELY-MANIPULATED WORK ON A CONDUIT OF A NUCLEAR FACILITY

[75] Inventors: Günter Schröder, Minden-Dützen; Rudolf Eichhhorn, Minden, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 28,498

[22] Filed: Mar. 20, 1987

Related U.S. Application Data

[62] Division of Ser. No. 717,460, Mar. 29, 1985, Pat. No. 4,674,926.

[30] Foreign Application Priority Data

Apr. 3, 1984 [DE] Fed. Rep. of Germany ....... 3412363

[51] Int. Cl.[4] .......... B23K 31/02; B23P 6/00
[52] U.S. Cl. .................. 228/103; 228/119; 228/169; 228/171; 228/49.3; 219/59.1; 29/402.13
[58] Field of Search .......... 228/103, 119, 169, 171, 228/184, 212, 5.1, 13, 18, 44.5, 49.3; 219/59.1, 60.2, 61; 29/402.13

[56] References Cited

U.S. PATENT DOCUMENTS

| | | | |
|---|---|---|---|
| 3,209,122 | 9/1965 | Johnston et al. | 219/61 |
| 3,841,547 | 10/1974 | Bartley | 219/60.2 |
| 3,849,871 | 11/1974 | Kaunitz | 228/169 |
| 3,912,151 | 10/1975 | Martin et al. | 228/171 |
| 3,961,417 | 6/1976 | George | 228/103 |
| 4,047,659 | 9/1977 | Vucic | 228/119 |
| 4,216,893 | 8/1980 | Glatthorn | 228/119 |
| 4,413,765 | 11/1983 | Tracy | 228/119 |
| 4,694,549 | 9/1987 | Rabe | 29/402.13 |

FOREIGN PATENT DOCUMENTS

| | | | |
|---|---|---|---|
| 1596 | 1/1982 | Japan | 228/119 |
| 181794 | 11/1982 | Japan | 228/103 |
| 1348792 | 3/1974 | United Kingdom | 228/119 |

Primary Examiner—Nicholas P. Godici
Assistant Examiner—Samuel M. Heinrich
Attorney, Agent, or Firm—Walter Ottesen

[57] ABSTRACT

The invention is directed to a method for performing remotely-manipulated work on a conduit of a nuclear facility. The method of the invention is for maintaining pipe conduits in a radioactively contaminated cell such as a large-area cell of a reprocessing facility for irradiated nuclear fuel. The defective conduit portion to be removed is sawn out of a conduit and a replacement conduit segment is welded into the conduit. In order to provide for rapidly and accurately welding the replacement conduit segment into the conduit, the step of machining the two conduit end portions is combined with the step of determining the inside dimension between the conduit end portions formed by the step of sawing out the defective conduit portion. An apparatus for carrying out the method of the invention is also disclosed.

5 Claims, 3 Drawing Sheets

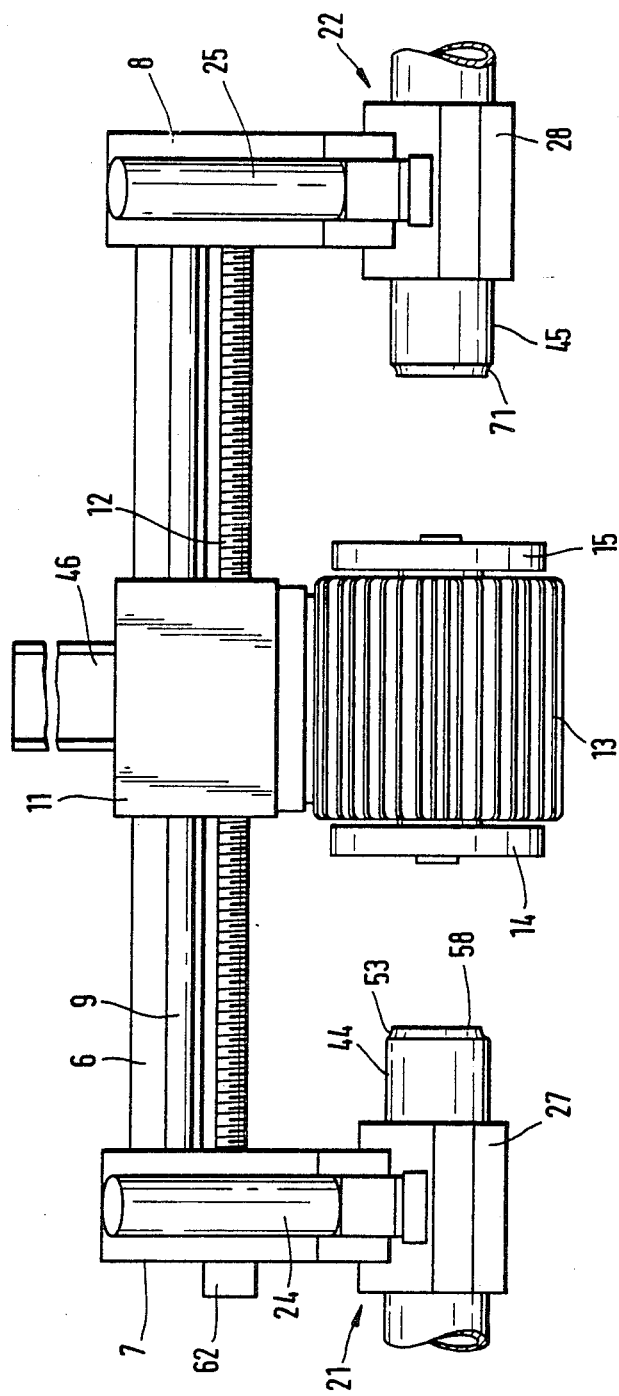
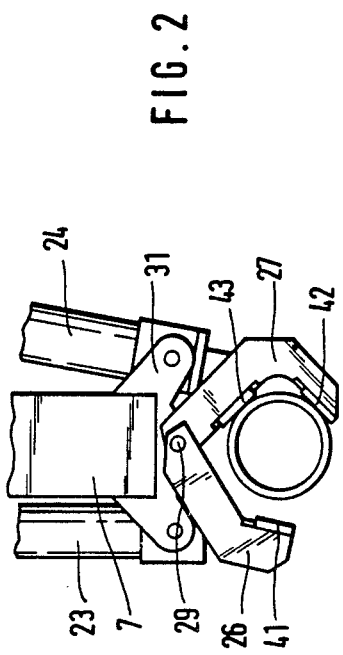
FIG. 1
FIG. 2

METHOD FOR PERFORMING REMOTELY-MANIPULATED WORK ON A CONDUIT OF A NUCLEAR FACILITY

This is a division of application Ser. No. 717,460, filed Mar. 29, 1985 now U.S. Pat. No. 4,674,926.

FIELD OF THE INVENTION

The invention relates to a method for maintaining pipe conduits in a radioactively charged cell such as a large-area cell of a facility for reprocessing irradiated nuclear fuel. In this method, a defective conduit portion is cut out of the conduit by sawing and a replacement conduit segment is welded into place. The invention also relates to an apparatus for carrying out the method of the invention.

BACKGROUND OF THE INVENTION

Maintenance of the process components and the pipe conduits interconnecting the same must be carried out by remote control in radioactively contaminated shielded cells in the nuclear field such as large-area cells in nuclear reprocessing facilities. For maintaining the conduits, it can be necessary for a leaky portion of the conduit to be cut out of a conduit and replaced by a replacement conduit segment which is welded into the conduit by remote manipulation. The replacement conduit segment is prepared outside the cell and, before it can be welded into place, the two sawn end faces of the conduit must be machined. The replacement conduit segment must correspond in length to the inner gap between the two end faces of the end portions of the cut conduit.

SUMMARY OF THE INVENTION

It is an object of the invention to provide a method wherein the conduit ends of the cut conduit are prepared for the follow-on welding operation at low cost. The method of the invention permits a rapid and reliable preparation of the rough-sawn conduit ends and makes it possible to insert the replacement conduit segment therebetween with dimensional accuracy.

The method of the invention is for maintaining the pipe conduits of a radioactively charged cell such as a large-area cell of a reprocessing facility for irradiated nuclear fuel wherein a portion of a conduit can develop a leak or become otherwise defective. The method of the invention includes the steps of: cutting the defective portion from the conduit thereby forming two mutually adjacent cut conduit end faces corresponding to respective conduit end portions; machine planing the end face of one of the conduit end portions; selecting the planed end face as a first reference point for measuring the length of the clear dimension between the conduit end portions; machine planing the end face of the other one of the conduit end portions; selecting the planed end face of the other conduit end portion as the end reference point for measuring the clear dimension; determining the length of the clear dimension from the reference points and preparing a replacement conduit segment having the length of said clear dimension; remotely manipulating the conduit segment into the gap between the conduit end portions; and, welding the conduit segment to the conduit end portions.

According to another feature of the invention, a recessed surface is machined into each one of the conduit end portions so as to extend around the entire outer periphery of the end face thereof.

After the defective conduit portion has been sawn and removed, one of the end faces is first subjected to a machine cutting operation so as to form a clean end face and a recessed surface defining half of a weld groove. The planed end face forms the first reference point of a length measurement distance. The end point of this length measurement distance is the finished machined end face of the other end portion of the conduit. The longitudinal dimension which is established in this manner is used in making the replacement conduit segment.

After the operation of machining the first conduit end face, the machining unit is moved to the other conduit end face and the displacement of the tool is measured and the length of the replacement conduit segment is determined with the aid of this measured value.

The essential advantage of these method steps is that during the machine cutting operation on the sawn faces of the two conduit end faces, the actual dimension between these two conduit ends is ascertained at the same time.

According to another feature of the invention, the method can include the step of machine turning the inner wall of each of the conduit end portions while simultaneously planing the end face and machining the recessed surface into the outer periphery of the end face.

The operation of conically machine turning the conduit end portions establishes equal wall thicknesses with respect to that conduit end portion and the replacement conduit segment which is likewise machined. Equality of wall thickness with respect to the mutually butting end faces of the conduit end portion and conduit segment is a requirement for the necessary follow-on automatic welding operation.

It is another object of the invention to provide an apparatus with which the rough-sawn conduit ends can be rapidly and reliably prepared for dimensionally accurately welding the replacement conduit segment into position.

The apparatus of the invention includes a connecting carrier beam; clamp connecting means for clamping said carrier beam to the conduit end portions so as to fix the position of the carrier beam with respect to the end portions; a machining unit for machining the end faces of the conduit end portions; a carriage movably mounted on the carrier beam for carrying the machining unit and for moving the same between the end faces; and, detecting means for detecting the distance through which the machining unit is moved by the carriage.

The connecting carrier beam is arranged parallel to the cut conduit after the apparatus has been clamped thereto. The carriage moves the machining unit between the two conduit ends and the distance covered by the machining unit is measured.

The threaded spindle has a known pitch and the revolutions of the spindle are detected by detector means in the form of a rotation detector during the displacement of the carriage. The length of the distance covered by the carriage is determined from the measurements made in this fashion.

According to another feature of the invention, the machining unit includes a drive shaft and two cutter heads mounted on respective ends of the drive shaft for machining corresponding ones of the conduit end portions; and, each of the cutter heads includes a plurality of cutting tools. With the apparatus of the invention configured in this manner, the distance traversed by the carriage is smaller than the actual gap in the conduit by an amount equal to the spacing between the two cutter heads. That spacing is known by virtue of the design configuration of the machining unit and can therefore be added to the measured length of the distance travelled by the carriage and machining unit. The result of this addition corresponds to the length of the required replacement conduit segment which is to be welded into position. This embodiment affords the advantage that the apparatus for machining the oppositely disposed conduit ends is of simple configuration.

Three pairs of cutting tools are disposed in each cutter head and perform three different machining operations at the same time in one working step.

BRIEF DESCRIPTION OF THE DRAWING

The invention will now be described with reference to the drawing wherein:

FIG. 1 is a view of the arrangement of the invention for preparing the sawn end faces of the conduit end portions for the welding operation;

FIG. 2 is an end view of the arrangement of FIG. 1 showing one of the clamping devices about to clamp onto a conduit end portion;

DESCRIPTION OF THE PREFERRED EMBODIMENTS OF THE INVENTION

Figure 3:
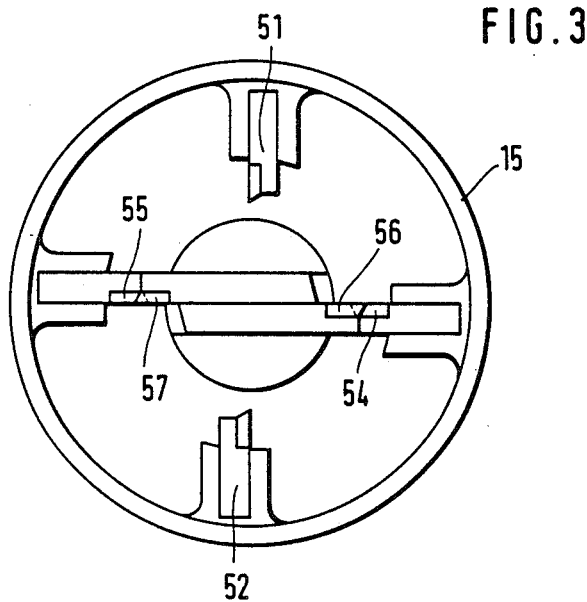
FIG. 3 shows a front elevation view of a cutter head.

The arrangement shown in FIG. 1 includes a beam-like connecting carrier 6 and clamping assemblies 7 and 8 mounted at the two ends thereof. Guide rails 9 are mounted on the connecting carrier 6 and extend over the entire length thereof, on both sides. A carriage 11 is movably mounted on the guide rails 9. The carriage 11 is movable along the connecting carrier 6 by means of a threaded spindle 12 which is rotatably driven by an electric motor.

An electric motor 13 is suspended on the carriage 11 and has an output shaft which extends therethrough and which carries cutter heads 14 and 15 on respective ends thereof. Cutting tools required for machining the conduit ends are mounted in the heads 14 and 15.

The clamping assemblies 7 and 8 carry the respective clamping units 21 and 22. The clamping unit 21 includes two geared motor units 23, 24 and a pair of clamping levers 26, 27. Likewise, the clamping unit 22 includes two geared motor units of which one unit 25 is shown and a pair of clamping levers for which one lever 28 is shown. The two clamping levers of each pair are rotatable about a common axis defined by a pin which for the clamping levers 26 and 27 is identified by reference numeral 29. The pin 29 is centrally mounted in an intermediate piece 31 disposed at the lower end of the clamping assembly. The same arrangement is provided for clamping assembly 8 of which one motor unit 25 and one clamping lever 28 is shown in FIG. 1.

The motor units 23, 24 are attached to the sides of the intermediate member 31 and have downwardly movable pressure spindles for acting on the levers 26 and 27 respectively.

One of the levers 26 of a pair of levers 26, 27 has a clamping surface 41 while the other lever 27 has two pressure plates 42 and 43 which are angularly spaced relative to each other by 90°. The clamping assemblies therefore provide a three-point clamping action for holding the conduit ends 44 or 45.

The entire apparatus can be picked up and transported at a handling block 46 by means of a power manipulator or by means of a block and tackle crane.

The cutter heads 14 and 15 are respective tool carriers in which the cutting tools required for machining the conduit ends are fitted. FIG. 3 shows a front elevation view of the cutter head 15.

There are three pairs of cutting tools. Cutting tools 51 and 52 constitute a first pair of cutting tools and are mounted on the inner periphery of the cutter head 15 so as to be diametrically opposite each other. The cutting tools 51 and 52 are radially positioned in such a way that they can be used to produce the half 71 (FIG. 1) of a weld groove which is desired at the outside periphery of the conduit end 45.

Cutting tools 54 and 55 constitute a second pair of cutting tools and are disposed at 90° with respect to the first pair of cutting tools 51 and 52. The second pair of cutting tools 54 and 55 plane the end face of the conduit end 45.

Figure 4:
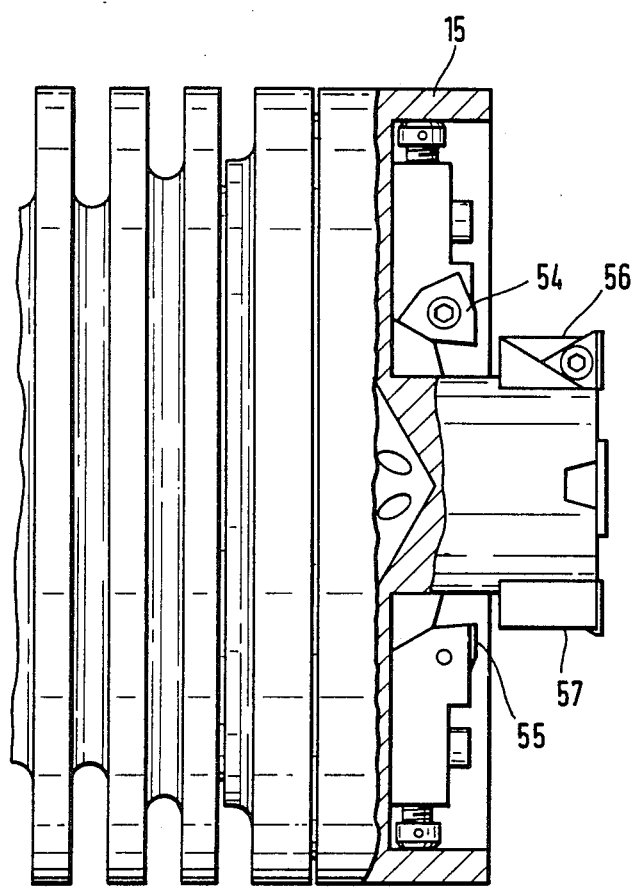
FIG. 4 is a side elevation view of the cutter head with the front end portion of the housing broken away to show the cutting tools; and, FIG. 5 is a side elevation view, in longitudinal section, through one conduit end portion.

Cutting tools 56 and 57 constitute a third pair of cutting tools and are arranged on the center shaft of the cutter head 15 so as to be diametrically opposite each other. In addition, when viewed in the axial direction, the third pair of cutting tools is disposed in front of the first and second pairs of cutting tools (51, 52) and (54, 55), respectively, as shown in FIG. 4. The cutting tools 56 and 57 turn the inside wall surface of the conduit end 45. The cutter head 14 is of the same configuration as cutter head 15.

The operation of the above-described apparatus will now be described.

After a conduit portion has been sawn out of a conduit by remotely manipulated equipment, the apparatus of the invention is picked up by a power manipulator at the handling block 46 and taken to the conduit at the location thereof where the conduit portion was removed. The operation of sawing out the conduit segment has left two mutually adjacent conduit ends 44 and 45 having respective end faces in a rough-sawn condition. The apparatus is placed with its opened pair of clamping levers 26, 27 of clamping assembly 7 on conduit end 44 and with its open pair of clamping levers of clamping assembly 8 on conduit end 45. The arrangement of the invention is firmly clamped in position on the conduit ends 44 and 45 by actuating the electric motor units 23, 24 and the two motor units of clamping assembly 8. When that is done, the conduit ends 44 and 45 are in alignment with each other.

Figure 5:
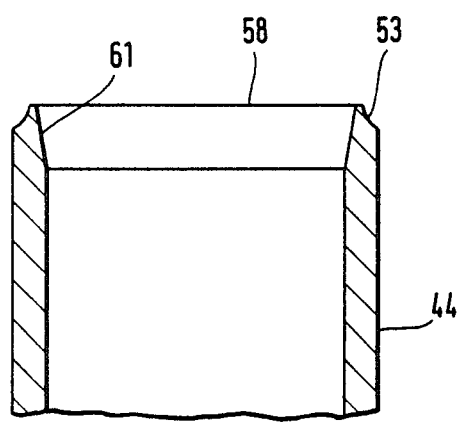

The spindle 12 for moving the carriage 11 is driven in rotation by means of an electric motor so that the carriage 11 with the machining unit (13, 14, 15) is moved against the one conduit end 44. Now, in one working operation at this conduit end 44, the end face 58 is planed with the pair of cutting tools 54, 55, one half 53 of a weld groove is machined onto the periphery of the conduit end by means of the pair of cutting tools 51, 52 and the inner wall of the conduit end 44 is provided with a tapering peripheral surface 61 (FIG. 5) which narrows inwardly by the machine turning action of the pair of cutting tools 56 and 57.

After that machining operation has been concluded, the threaded spindle 12 is rotated in the opposite direction and the revolutions thereof are detected and evaluated by means of a rotation sensor 62, for example an inductive rotation sensor. The machining unit (13, 14, 15) is moved away from the machined conduit end 44 and driven to the other rough-sawn conduit end 45 where the same machining operation is carried out. That operation results in the formation of a weld groove half 71 which is in mirror image relationship to the half 53 on conduit end 44.

After the machining operation on conduit end 45 has been completed, the dimension between the two machined end faces 58 of the two conduit ends 44 and 45 is detected by means of the rotations of the threaded spindle 12 and displayed. It is now possible to produce a replacement conduit segment outside of the cell having exactly the required length and which precisely corresponds to the clear dimension between the two machined conduit ends 44 and 45 and which has parallel weld edges which, with the respective peripheral recess surfaces 53 and 71, define two weld grooves. This replacement conduit segment is moved with remotely-controlled equipment into a position between the two conduit ends 44 and 45 and is welded in position with remotely-controlled apparatus.

It is understood that the foregoing description is that of the preferred embodiments of the invention and that various changes and modifications may be made thereto without departing from the spirit and scope of the invention as defined in the appended claims.

What is claimed is:

1. A method for maintaining the pipe conduits of a radioactively charged cell of a reprocessing facility for irradiated nuclear fuel wherein a portion of a conduit can develop a leak or become otherwise defective, the method comprising the steps of:
    cutting the defective portion from the conduit thereby forming two mutually adjacent cut conduit end faces corresponding to respective conduit end portions;
    tightly clamping said end portions to align the same with respect to each other;
    moving a machining unit to the end face of one of the conduit end portions and machine planing said one end face;
    selecting the planed end face as a first reference point for measuring the length of the clear dimension between said conduit end portions;
    displacing the machining unit to the end face of the other one of said conduit end portions and machine planing said end face of said other conduit end portion;
    selecting the planed end face of said other conduit end portion as the end reference point for measuring said clear dimension;
    measuring the displacement of the machining unit from said first reference point to said end reference point;
    determining the length of said clear dimension and therefore of a replacement conduit segment with the aid of the measured value of said displacement;
    preparing said replacement conduit segment having said length;
    remotely manipulating said conduit segment into the gap between said conduit end portions; and,
    welding said conduit segment to said conduit end portions.

2. The method of claim 1, comprising the further steps of: machining a recessed surface into said one conduit end portion so as to extend around the entire outer periphery of the end face thereof to define one surface of a first weld groove; and,
    machining a recessed surface into said other conduit end portion so as to extend around the entire outer periphery of the end face thereof to define one surface of a second weld groove.

3. A method for maintaining the pipe conduits of a radioactively charged cell of a reprocessing facility for irradiated nuclear fuel wherein a portion of a conduit can develop a leak or become otherwise defective, the method comprising the steps of:
    cutting the defective portion from the conduit thereby forming two mutually adjacent cut conduit end faces corresponding to respective conduit end portions;
    moving a machining unit to the end face of one of the conduit end portions and machine planing said end face;
    selecting the planed end face as a first reference point for measuring the length of the clear dimension between said conduit end portions;
    moving said machining unit from said end face of said one conduit end portion to said end face of said other conduit end portion;
    machine planing the end face of said other one of said conduit end portions;
    selecting the planed end face of said other conduit end portion as the end reference point for measuring said clear dimension;
    measuring the displacement of said machining unit after said end face of said other conduit end portion has been machined;
    determining the length of said clear dimension and therefore of a replacement conduit segment with aid of the measured value of said displacement;
    preparing said replacement conduit segment having said length;
    remotely manipulating said conduit segment into the gap between said conduit end portions; and,
    welding said conduit segment to said conduit end portions.

4. The method of claim 3, wherein said machining unit has two cutter heads disposed directly opposite each other at a predetermined spacing therebetween for machining respective ones of said end faces and wherein said machining unit is mounted on a carriage for moving said machining unit between said end faces; the method comprising the further steps of:
    moving said carriage with said machining unit from the end face of said one conduit end portion to the end face of said other conduit end portion;
    determining the displacement of said carriage after the end face of said other one of said end portions has been machined and applying said spacing to the measured value of said displacement for determining said length of said conduit segment.

5. The method of claim 4, the method further comprising the step of machine turning the inner wall of each one of said conduit end portions while simultaneously planing the end face and machining said recessed surface.

* * * * *